United States Patent
Li et al.

(10) Patent No.: US 11,482,362 B2
(45) Date of Patent: Oct. 25, 2022

(54) TRANSFER TYPE CONTRA-ROTATING GEOMAGNETIC ENERGY STORAGE-RELEASE DELIVERY SYSTEM AND METHOD

(71) Applicants: INSTITUTE OF MECHANICS, CHINESE ACADEMY OF SCIENCES, Beijing (CN); GUANGDONG ACADEMY OF AEROSPACE RESEARCH IMECH, CAS, Guangzhou (CN)

(72) Inventors: Wenhao Li, Beijing (CN); Guanhua Feng, Beijing (CN); Heng Zhang, Beijing (CN)

(73) Assignees: INSTITUTE OF MECHANICS, CHINESE ACADEMY OF SCIENCES, Beijing (CN); GUANGDONG ACADEMY OF AEROSPACE RESEARCH IMECH, CAS, Guangzhou (CN)

( * ) Notice: Subject to any disclaimer, the term of this patent is extended or adjusted under 35 U.S.C. 154(b) by 0 days.

(21) Appl. No.: 17/636,375

(22) PCT Filed: Jun. 23, 2020

(86) PCT No.: PCT/CN2020/097730
§ 371 (c)(1),
(2) Date: Feb. 18, 2022

(87) PCT Pub. No.: WO2021/031686
PCT Pub. Date: Feb. 25, 2021

(65) Prior Publication Data
US 2022/0270802 A1 Aug. 25, 2022

(30) Foreign Application Priority Data
Aug. 21, 2019 (CN) .......................... 201910774222.1

(51) Int. Cl.
*H01F 5/00* (2006.01)
*H01F 7/20* (2006.01)
(Continued)

(52) U.S. Cl.
CPC ............. *H01F 7/202* (2013.01); *B64G 1/244* (2019.05); *B64G 1/646* (2013.01); *B64G 1/52* (2013.01)

(58) Field of Classification Search
CPC ......... H01F 7/202; B64G 1/244; B64G 1/646; B64G 1/52
(Continued)

(56) References Cited

U.S. PATENT DOCUMENTS 5,082,211 A * 1/1992 Werka .................. B64G 1/1078
244/167
5,568,904 A * 10/1996 Brock .................... B64G 1/242
244/158.6
(Continued)

FOREIGN PATENT DOCUMENTS

CN 105091537 A * 11/2015
CN 204802150 U * 11/2015
(Continued)

*Primary Examiner* — Bernard Rojas
*Assistant Examiner* — Lisa N Homza
(74) *Attorney, Agent, or Firm* — Bayramoglu Law Offices LLC

(57) ABSTRACT

A transfer type contra-rotating geomagnetic energy storage-release delivery system is disclosed. The system includes a control system, a three-axis control moment canceller and an energy system, which are arranged on a delivery mother spacecraft, and the delivery mother spacecraft is connected, through support rod structures, with a strong magnetic moment generating device, a contra-rotating transmission mechanism and two delivery connection rod structures arranged at the two ends of the contra-rotating transmission mechanism, the strong magnetic moment generating device (Continued)

is arranged between the contra-rotating transmission mechanism and the delivery mother spacecraft, the two delivery connection rod structures are provided with slidable mass blocks respectively, and the strong magnetic moment generating device and the contra-rotating transmission mechanism provide energy through the energy system. The strong magnetic moment generating device is free of accelerated rotation of an attitude, thereby decoupling the dual coupling.

7 Claims, 3 Drawing Sheets

(51) Int. Cl.
 *B64G 1/24* (2006.01)
 *B64G 1/64* (2006.01)
 *B64G 1/52* (2006.01)
(58) Field of Classification Search
 USPC .......................................................... 335/299
 See application file for complete search history.

(56) References Cited

U.S. PATENT DOCUMENTS

| | | | | |
|---|---|---|---|---|
| 6,017,000 A * | 1/2000 | Scott | ........................ | B64G 1/24 |
| | | | | 244/158.6 |
| 6,419,191 B1 * | 7/2002 | Hoyt | ...................... | B64G 1/648 |
| | | | | 244/166 |
| 6,830,222 B1 * | 12/2004 | Nock | ...................... | B64G 1/242 |
| | | | | 244/110 D |
| 6,843,446 B2 * | 1/2005 | Scott | ...................... | B64G 1/244 |
| | | | | 244/10 |
| 6,942,186 B1 * | 9/2005 | Levin | ...................... | B64G 1/648 |
| | | | | 244/166 |
| 8,052,092 B2 * | 11/2011 | Atmur | ...................... | B64G 1/66 |
| | | | | 244/172.6 |
| 9,434,485 B1 * | 9/2016 | Lehocki | ................... | B64G 1/22 |
| 9,938,027 B2 * | 4/2018 | Hickman | ............... | B64G 1/405 |
| 10,266,284 B2 * | 4/2019 | Coffey | .................... | B64G 1/648 |
| 10,654,596 B1 * | 5/2020 | Eller | ...................... | B64G 1/646 |
| 10,696,425 B2 * | 6/2020 | Hickman | ............... | B64G 1/646 |
| 2004/0026571 A1 * | 2/2004 | Scott | ........................ | B64G 1/36 |
| | | | | 244/172.5 |
| 2007/0285304 A1 | 12/2007 | Cooper | | |
| 2010/0193640 A1 * | 8/2010 | Atmur | .................... | B64G 1/242 |
| | | | | 244/158.2 |
| 2011/0121139 A1 * | 5/2011 | Poulos | ................... | B64G 1/646 |
| | | | | 244/169 |
| 2012/0085869 A1 * | 4/2012 | Lloyd | ...................... | B64G 1/68 |
| | | | | 244/158.6 |
| 2012/0292449 A1 * | 11/2012 | Levin | ................... | B64G 1/1085 |
| | | | | 244/171.1 |
| 2016/0090197 A1 * | 3/2016 | Hickman | ............... | B64G 1/646 |
| | | | | 244/158.5 |
| 2017/0327250 A1 * | 11/2017 | Hickman | ............... | B64G 1/005 |
| 2018/0003970 A1 * | 1/2018 | Otani | .................. | G02B 27/0101 |
| 2022/0073219 A1 * | 3/2022 | Dargin, III | ............. | B64G 1/242 |

FOREIGN PATENT DOCUMENTS

| | | | | |
|---|---|---|---|---|
| CN | 105966643 | A | | 9/2016 |
| CN | 107719708 | A | | 2/2018 |
| CN | 108069050 | A | | 5/2018 |
| CN | 108248896 | A | | 7/2018 |
| CN | 109279050 | A | | 1/2019 |
| CN | 109795721 | A | | 5/2019 |
| CN | 109969433 | A | | 7/2019 |
| CN | 110077624 | A | | 8/2019 |
| CN | 110481815 | A | | 11/2019 |
| CN | 111483736 | A | * | 8/2020 |
| CN | 214796760 | U | * | 11/2021 |
| CN | 215103824 | U | * | 12/2021 |
| WO | 2011103255 | A1 | | 8/2011 |
| WO | 2016066837 | A1 | | 5/2016 |

* cited by examiner

TRANSFER TYPE CONTRA-ROTATING GEOMAGNETIC ENERGY STORAGE-RELEASE DELIVERY SYSTEM AND METHOD

CROSS REFERENCE TO THE RELATED APPLICATIONS

This application is the national phase entry of International Application No. PCT/CN2020/097730, filed on Jun. 23, 2020, which is based upon and claims priority to Chinese Patent Application No. 201910774222.1, filed on Aug. 21, 2019, the entire contents of which are incorporated herein by reference.

TECHNICAL FIELD

The embodiment of the present invention relates to the technical field of space debris de-orbit, and particularly to transfer type contra-rotating geomagnetic energy storage-release delivery system and method.

BACKGROUND

Even a space junk with a diameter of 10 cm can pose a serious threat to the spacecraft and astronauts. The Hubble Telescope, the Space Shuttle and the International Space Station have all been impacted by the space junk. Due to the increasing human space activities and the Kessler effect, the probability of the threat caused by the space junk is rapidly increasing (Kessler effect: More space debris is generated due to the impact of space debris).

The Kessler effect further increases the threat of space debris. For example, in 2009, Russia's abandoned Comos satellite collided with the Iridum satellite of the United States, resulting in more than 2,000 space debris. If the existing space debris cannot be actively and effectively removed, the amount of space debris will continuously significantly increase, which will seriously affect the human space development process.

Among the current in-orbit more than 20,000 space debris with the diameter larger than 10 cm, nearly 70% of them are distributed in low-earth orbits with different inclinations from 500 km to 1,000 km. If the space debris attenuates the orbital height thereof depending only on its own atmospheric resistance, the debris is not able to enter the Earth's atmosphere for decades. The low-orbit space debris has features of scattered distribution, large quantity, high threat and low value as compared with geosynchronous orbit (36000 km, unique orbit, scarce resources). Though the low-orbit space debris is capable of being actively removed, the problems in the efficiency and economics of removing low-orbit space debris are difficult to solve.

The preferred way to deal with the space debris is to artificially change its orbital height to reduce the perigee height of its orbit to 200 km or less, thereby enabling the debris to quickly reduce the orbital semi-major axis under the influence of the earth's atmospheric resistance and to crash into the atmosphere to burn.

Among the currently proposed various methods, the active drag de-orbit method using chemical/electric thrust is the most mature, but is extremely expensive. The passive orbit-descending method for increasing the surface-to-mass ratio by, for example, installing airbag resistance sails/painting foam on the debris does not consume the de-orbit propulsion working medium, but consumes installation materials, and the time required for the debris to descend orbit is also counted in years, which undoubtedly greatly increases the probability of secondary collision.

In addition, all countries are actively developing a debris cleaning method of non-working medium consumption type. Some methods are difficult to achieve though being well conceived, such as the method of using ground/space-based high-energy lasers to clean debris. The basic principle of such a method is to burn by using high-energy laser such that a burning product expands sharply away from the debris and the debris receives the recoil force to descend the orbit. Such a method is possibly theoretically realizable, but it is difficult to solve the problems such as how to generate the expected recoil force, how to effectively burn instead of destroying and generating new debris groups. Therefore, such a method can only be used to remove micro-objects of 10 cm or less.

Among the orbital transformation and de-orbit methods of non-working medium consumption type, the electric tether is currently considered to be the most feasible and realizable method. The electric tether collects the charged particles in the space and adjusts the orbit using the ampere force received by the energized rope in the earth's magnetic field in low-orbit space, which consumes only the power rather than working medium. However, the efficiency of the electric tether system depends on the rope scale, and the huge scale from several kilometers to tens of kilometers makes the problem in the reliability of the stable operation of the tether system in the space very prominent.

Although many theoretical studies and space experiments have shown that the tether system has a considerable safety factor, there are also painful experiences. The tether of the United States SED-2 (launched in 1994, the tether is unfolded by 19.7 km) was cut off by space debris/micrometeors in only 4 days after unfolding, indicating that the space safety problem of the tether has not yet resolved. For this reason, the de-orbit method for geomagnetic energy storage low-orbit space debris is adopted to effectively solve this problem. During the energy storage period of this method, it is expected that the rotational momentum continues to accumulate, which inevitably requires the continuous acceleration of the rotating mechanism. However, if the magnet and the rotating mechanism are integrated with each other, the continuously accelerated rotation of the magnet will be deeply coupled with the adjustment of the direction of the magnet. In addition, in the orbital flight, the adjustment of the direction of the magnet and the flight process will inevitably be deeply coupled. The dual coupling of acceleration and orbit will greatly increase the difficulty and uncertainty.

SUMMARY

For this reason, the embodiment of the present invention provides transfer type contra-rotating geomagnetic energy storage-release delivery system and method to solve problems occurring in the conventional techniques.

In order to achieve the above object, the embodiment of the present invention provides the following technical solutions.

In the first aspect of the embodiment of the present invention, a transfer type contra-rotating geomagnetic energy storage-release delivery system is provided, which includes a control system, a three-axis control moment canceller and an energy system for supplying power to the control system and the three-axis control moment canceller, which are arranged on a delivery mother spacecraft, wherein the delivery mother spacecraft is connected, through support rod structures, with a strong magnetic moment generating device, a contra-rotating transmission mechanism and a first delivery connection rod structure and a second delivery connection rod structure for delivering a target article;

the first delivery connection rod structure is vertically connected to the end of the support rod structure, the contra-rotating transmission mechanism is arranged on the portion of the support rod structure close to the first delivery connection rod structure, the strong magnetic moment generating device is arranged between the contra-rotating transmission mechanism and the delivery mother spacecraft, the second delivery connection rod structure is arranged between the contra-rotating transmission mechanism and the strong magnetic moment generating device, a first slidable mass block and a second slidable mass block are respectively arranged on the first delivery connection rod structure and the second delivery connection rod structure, and the strong magnetic moment generating device and the contra-rotating transmission mechanism provide energy through the energy system.

As a preferred solution of the embodiment of the present invention, the strong magnetic moment generating device is composed of two orthogonally-arranged solenoid coils, and the planes of the two orthogonally-arranged solenoid coils are both perpendicular to the axial direction of the support rod structure.

As a preferred solution of the embodiment of the present invention, the solenoid coil generates strong magnetic moment by using superconductor materials and a low-temperature system.

As a preferred solution of the embodiment of the present invention, the target articles are respectively arranged on one end of the first delivery connection rod structure and one end of the second delivery connection rod structure, or at both ends thereof at the same time.

In the second aspect of the embodiment of the present invention, a transfer type contra-rotating geomagnetic energy storage-release delivery method is provided, which includes:

step 100: respectively determining energy storage direction and energy storage strategy based on an orbital flight inclination of the spacecraft and the relation between the orbital flight inclination and a set angle;

step 200: measuring a current flight attitude of the spacecraft, adjusting the flight attitude of the spacecraft, associating a direction of generated magnetic moment, a direction of energy storage accumulation magnetic moment and the flight attitude of the spacecraft, and maintaining the flight attitude after association;

step 300: after the preparation for delivering the target article is finished, adjusting the slidable mass blocks on two delivery connection rod structures such that moments of inertia of two assemblies, each composed of the target article, the slidable mass block and the delivery connection rod structure, relative to the transmission shaft of the contra-rotating transmission mechanism are the same;

step 400: pneumatically starting the contra-rotating transmission mechanism to drive the two assemblies to perform the accelerated rotation in opposite directions;

step 500: detecting whether relative linear velocities corresponding to angular velocities of the two assemblies when rotating satisfy the requirements for delivery or de-orbit, if not, returning back to step 300, and if the relative linear velocities satisfy the requirements, terminating the accelerated rotation process of the two assemblies in opposite directions, and performing delivery or de-orbit releasing according to the designated targets in turn; and step 600: performing energy dissipating and unloading according to the direction of the residual rotational momentum of the contra-rotating transmission mechanism, and proceeding to the next energy storage cycle after completion of the energy dissipation and unloading.

As a preferred solution of the embodiment of the present invention, the moments of inertia of the two assemblies relative to the transmission shaft of the contra-rotating transmission mechanism are the same, and during contra-rotation, there is no active interference with the rotation attitude of the delivery mother spacecraft and the strong magnetic moment generating device.

As a preferred solution of the embodiment of the present invention, the energy dissipation and unloading method in the step 600 includes enabling the magnetic moment generated by the strong magnetic moment generating device and the accelerated rotation process in opposite directions to dissipate and unload the residual rotational momentum of the contra-rotating transmission mechanism.

BRIEF DESCRIPTION OF THE DRAWINGS

In order to describe the embodiments of the present invention or the technical solutions in the conventional technique more clearly, the drawings to be used in the description of the embodiments or the conventional technique are briefly explained below. Obviously, the drawings in the following description are only exemplary. For those skilled in the art, other implementation drawings can be derived from the provided drawings without any creative work.

Figure 1:
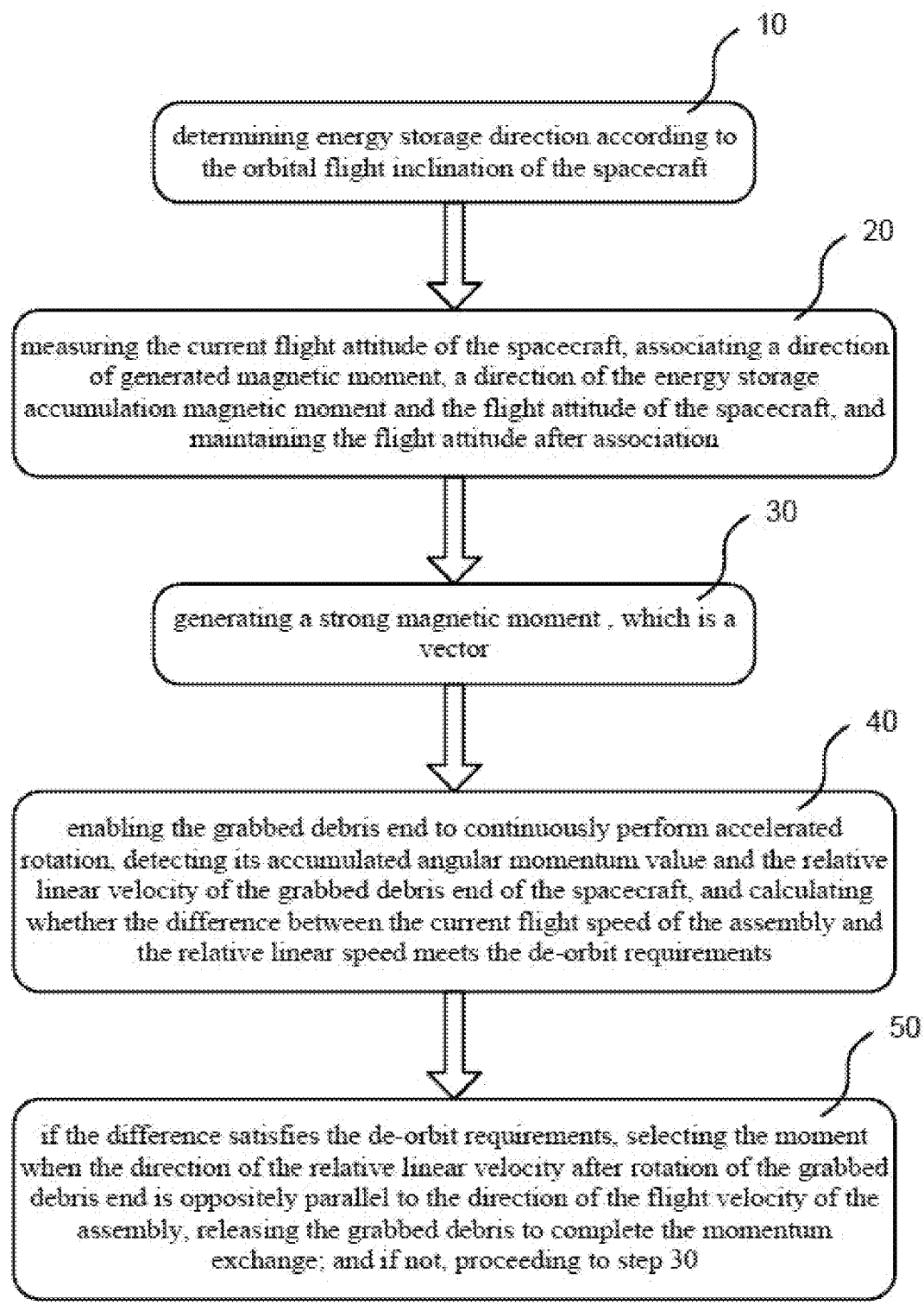
FIG. 1 is a flowchart showing a space debris de-orbit control method according to a first embodiment of the present invention.

The numerals in the drawings represent 10. delivery mother spacecraft; 20. support rod structure; 30. strong magnetic moment generating device; 40. contra-rotating transmission mechanism; 50. delivery connection rod structure.

DETAILED DESCRIPTION OF THE EMBODIMENTS

The embodiments of the present invention are described below using specific examples, and those skilled in the art can easily understand the other advantages and effects of the present invention from the contents disclosed in this description. Obviously, the described embodiments are merely part of the embodiment of the present invention, and do not cover all embodiments. All other embodiments achieved by those skilled in the art based on the embodiment of the present invention without any creative work shall fall within the protection scope of the present invention.

Figure 2:
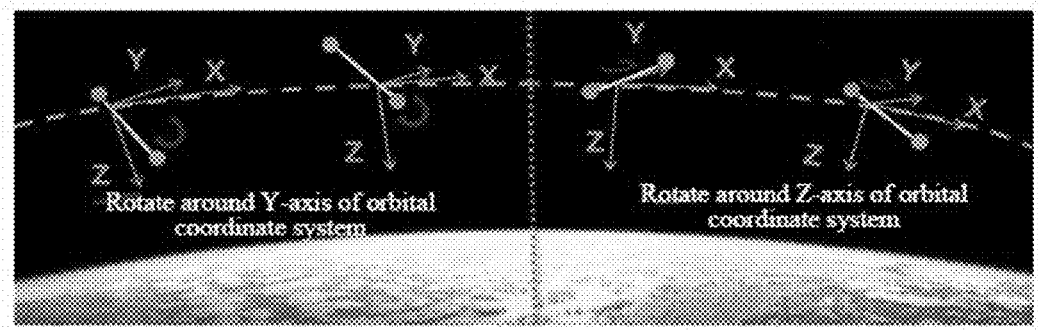
FIG. 2 is a schematic diagram of the orbital flight inclination according to the first embodiment of the present invention.

As shown in FIG. 1 and FIG. 2, the present invention provides a geomagnetic energy storage low-orbit space debris de-orbit control method in which the geomagnetic energy storage is carried out by the spacecraft grabbing the space debris, the geomagnetic energy storage includes the following steps.

Step 10. determining the energy storage direction according to the orbital flight inclination of the spacecraft;

when the orbital flight inclination of the spacecraft is greater than a set angle, the energy storage accumulation is carried out around the y-axis of the orbital plane; and when the orbital flight inclination is smaller than the set angle, the energy storage accumulation is carried out around the z-axis of the orbital plane.

Wherein, the energy storage accumulation in this embodiment specifically refers to continuous acceleration in a preset direction, which requires continuously generating magnetic moment in the preset direction to be capable of continuously increasing the speed in this direction as time goes by.

According to the orbital height from 100 to 1000 km, under different orbital inclinations, two different methods are used to calculate the efficiency of energy storage accumulation. The comparison result about efficiency shows that the demarcation point of the inclination is at the preferred angle, and the set angle is preferably 49.14°.

Step 20: measuring the current flight attitude of the spacecraft, the parameters of which include the altitude h of the spacecraft, the orbital inclination, the geographical longitude and latitude of the sub-satellite point of the spacecraft, and the geomagnetic field components $B_x^I$, $B_y^I$, $B_z^I$ of the spacecraft's current position in the geomagnetic coordinate system; and adjusting the flight attitude of the spacecraft, associating a direction of generated magnetic moment, a direction of the accumulated torsional moment of the magnetic moment and the flight attitude of the spacecraft, and maintaining the flight attitude after association;

wherein, the magnetic moment is generated by the current occurring in the orthogonal coil fixedly connected to the spacecraft, and is unrelated to the attitude of the spacecraft. The direction of the generated magnetic moment and the direction of accumulated torsional moment are also not the same, which are orthogonal to each other in an instantaneous moment.

The associating process can be interpreted as follows. The spacecraft is required to have an attitude angle when performing a specific task. In order to generate a specific accumulation velocity on a specific orbital surface, the direction of the delivery mechanism fixedly connected to the spacecraft needs to be aligned. Furthermore, the strong magnetic moment generating device (orthogonal coil) is fixedly connected to the spacecraft, and the solution strategy for strong magnetic moment generation is strongly related to the distribution of the geomagnetic field. Therefore, pre-installation and adjustment according to the attitude of the spacecraft are required. The relative relation of the above three factors needs to be determined before the delivery.

Step 30: generating a strong magnetic moment $\vec{m}$, which is a vector;

when the energy storage accumulation is carried out around the Y-axis of the orbital plane, the strategy for generating the magnetic moment $\vec{m}$ is as follows:

$$\begin{cases} Cmd\_m_x = \begin{cases} \mp \frac{2tg\varphi|m|}{\sqrt{1+4tg^2\varphi}} & -\frac{\pi}{2} \leq u \leq \frac{\pi}{2} \\ \pm \frac{2tg\varphi|m|}{\sqrt{1+4tg^2\varphi}} & \frac{\pi}{2} \leq u \leq \frac{3\pi}{2} \end{cases} \\ Cmd\_m_y = 0 \\ Cmd\_m_z = \begin{cases} \pm \frac{|m|}{\sqrt{1+4tg^2\varphi}} & -\frac{\pi}{2} \leq u \leq \frac{\pi}{2} \\ \mp \frac{|m|}{\sqrt{1+4tg^2\varphi}} & \frac{\pi}{2} \leq u \leq \frac{3\pi}{2} \end{cases} \end{cases}$$

When the energy storage accumulation is carried out around the Z-axis of the orbital plane, the strategy for generating the magnetic moment $\vec{m}$ is as follows:

$$\begin{cases} Cmd\_m_x = 0 \\ Cmd\_m_y = \pm |m| \\ Cmd\_m_z = 0 \end{cases}$$

wherein, $Cmd\_m_x$, $Cmd\_m_y$, $Cmd\_m_z$ represent the magnitudes of the magnetic moment components expected to be adjusted in respective directions in the geomagnetic coordinate system, $|m|$ represents the magnitude of the total magnetic moment that can be generated, $\varphi$ represents the current geographical latitude corresponding to the sub-satellite point of the spacecraft during the in-orbit flight of the spacecraft, u represents the angular distance of the ascending node in the current flight of the spacecraft;

Step 40. enabling the grabbed debris end to continuously perform accelerated rotation, detecting its accumulated angular momentum value and the relative linear velocity $\Delta V$ of the grabbed debris end of the spacecraft, and calculating whether the difference V-$\Delta V$ between the current flight speed V of the assembly and the relative linear speed $\Delta V$ meets the de-orbit requirements;

Step 50. if the difference V-$\Delta V$ satisfies the de-orbit requirements, selecting the moment when the direction of the relative linear velocity $\Delta V$ after rotation of the grabbed debris end is oppositely parallel to the direction of the flight velocity V of the assembly, releasing the grabbed debris to complete the momentum exchange; and if not, proceeding to step 30.

Wherein, the momentum exchange refers to conversing the rotational kinetic energy of the system into translational kinetic energy, such that the space debris or target is increased in de-orbit velocity and leaves the existing orbit to enter the atmosphere to burn.

The first embodiment of the present invention utilizes the rotational moment of a magnet in the terrestrial space magnetic field, (for example, a compass, when the direction and size of the magnet are actively and effectively controlled, it can continuously perform accelerated rotation), and when the spacecraft grabs the space debris or target, the grasped debris end continuously performs accelerated rotation to drive the grabbed space debris to rotate accordingly. At the moment of release, the rotational kinetic energy of the system is converted into the translational kinetic energy, and the space debris or target is increased in de-orbit velocity and leaves the existing orbit to enter the atmosphere.

The first embodiment of the present invention can achieve in-orbit delivery, low-cost de-orbit and orbit change without consuming any working medium. non-consumption of working medium means achieving in-orbit flight and execution of missions for a long time, and implementing de-orbit operations of large amount of space debris or target, which significantly improves the efficiency and economics of low-orbit space debris.

The first embodiment of the present invention also has the advantage of flexible in-plane/out-of-plane delivery, and the de-orbital momentum of the debris can be used to flexibly change the orbit of delivery primary star without consuming working medium. This method has high controllability and low dependence on the system scale of the delivery capability. Since this method has less requirements on the scale though using the energy of the geomagnetic field as well, the controllability of the implementation is improved, and the probability of external threats is effectively reduced.

Second Embodiment

Figure 3:
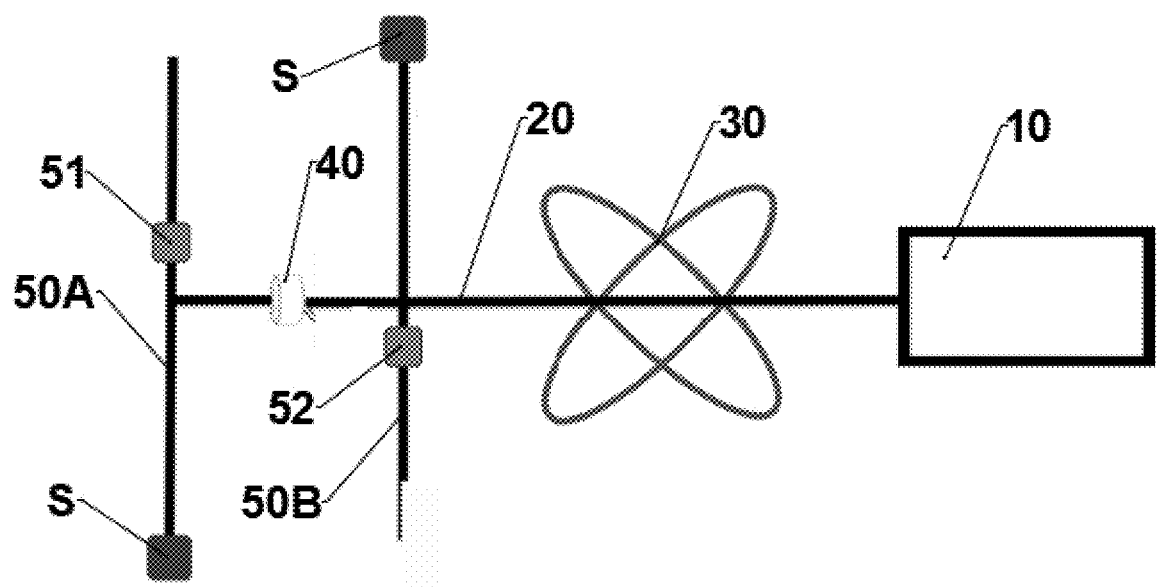
FIG. 3 is a schematic diagram of the system structure of a second embodiment of the present invention.

As shown in FIG. 3, the present invention provides a transfer type contra-rotating geomagnetic energy storage-release delivery system, which generally includes a control system, a three-axis control moment canceller and an energy system for supplying power to the control system and the three-axis control moment canceller which are arranged on a delivery mother spacecraft 10.

Wherein, the three-axis control moment canceller may be a flywheel, a control moment gyro, a momentum ball, or the like. The energy system may be a solar cell array, and the control signals are all output from the control system of the delivery mother spacecraft.

In order to realize the decoupling of the double coupling, the mother spacecraft 10 is mainly connected, through support rod structures 20, with a strong magnetic moment generating device 30, a contra-rotating transmission mechanism 40 and a first delivery connection rod structure 50A and a second delivery connection rod structure 50B for delivering a target article S. The first delivery connection rod structure 50A is vertically connected to the end of the support rod structure 20, the contra-rotating transmission mechanism 40 is arranged on the portion of the support rod structure 20 close to the first delivery connection rod structure 50A, the strong magnetic moment generating device 30 is arranged between the contra-rotating transmission mechanism 40 and the delivery mother spacecraft 10, the second delivery connection rod structure 50B is arranged between the contra-rotating transmission mechanism 40 and the strong magnetic moment generating device 30, a first slidable mass block 51 and a second slidable mass block 52 are respectively arranged on the first delivery connection rod structure 50A and the second delivery connection rod structure 50B, and the strong magnetic moment generating device 30 and the contra-rotating transmission mechanism 40 provide energy through the energy system.

The strong magnetic moment generating device 30 is composed of two orthogonally-arranged solenoid coils, and the planes of the two orthogonally-arranged solenoid coils are both perpendicular to the axial direction of the support rod structure 20. The solenoid coil generates strong magnetic moment by using superconductor materials and a low-temperature system.

The target articles S are respectively arranged on one end of the first delivery connection rod structure 50A and one end of the second delivery connection rod structure 50B, or at both ends thereof at the same time. The target article S is generally a space debris.

Figure 4:
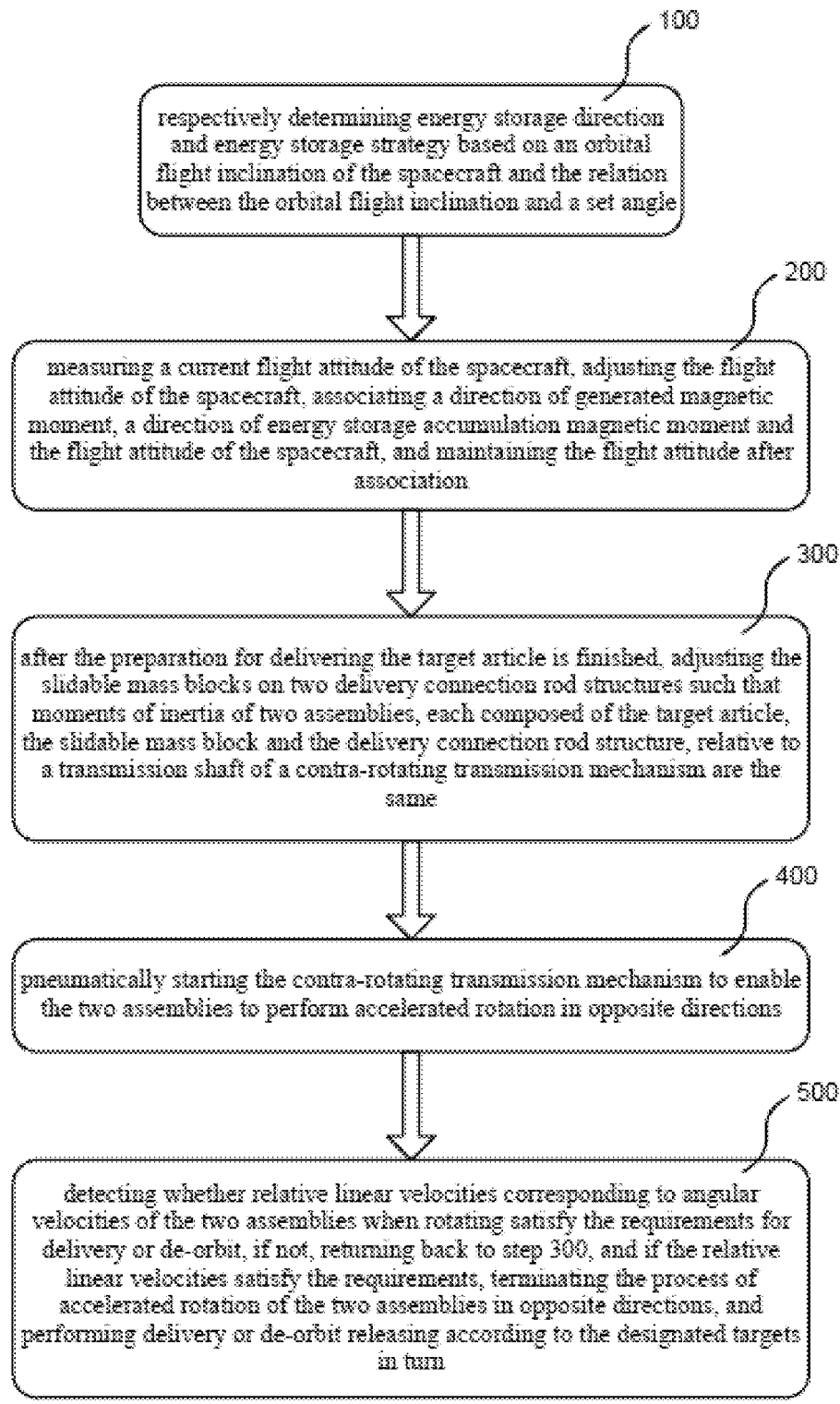
FIG. 4 is a flowchart showing low-orbit geomagnetic energy storage-release delivery method according to the second embodiment of the present invention.

On the basis of the above system, in consideration of the geomagnetic energy storage low-orbit space debris de-orbit control method of the first embodiment, as shown in FIG. 4, a transfer type contra-rotating geomagnetic energy storage-release delivery method is further provided, which specifically includes the following steps.

Step 100: respectively determining energy storage direction and energy storage strategy based on an orbital flight inclination of the spacecraft and the relation between the orbital flight inclination and a set angle. The details are the same as the step 10 and step 20 of the first embodiment.

Step 200: measuring a current flight attitude of the spacecraft, adjusting the flight attitude of the spacecraft, associating a direction of generated magnetic moment, a direction of energy storage accumulation magnetic moment and the flight attitude of the spacecraft, and maintaining the flight attitude after association.

On the basis of the above steps, the method is further divided into four stages in sequence, including the preparatory stage before the energy storage delivery, the energy storage delivery stage, the detection release determination stage, and the post-release energy dissipation stage.

Step 300: the preparatory stage before the energy storage delivery: after the preparation for delivering the target article is finished, adjusting the slidable mass blocks on two delivery connection rod structures such that moments of inertia of two assemblies, each composed of the target article, the slidable mass block and the delivery connection rod structure, relative to a transmission shaft of a contra-rotating transmission mechanism are the same. The sliding of the mass slider can solve the problem of inertia difference occurring when the two assemblies deliver target articles with different masses.

Step 400: the energy storage delivery stage: pneumatically starting the contra-rotating transmission mechanism to enable the two assemblies to perform accelerated rotation in opposite directions. Since the moments of inertia of the two assemblies relative to the transmission shaft are the same, the both do not actively interfere with the rotation attitude of the delivery mother spacecraft and its attached strong magnetic moment generating device during contra-rotating.

Step 500: the detection release determination stage: detecting whether relative linear velocities corresponding to angular velocities of the two assemblies when rotating satisfy the requirements for delivery or de-orbit, if not, returning back to step 300, and if the relative linear velocities satisfy the requirements, terminating the process of rotation acceleration of the two assemblies in opposite directions, and performing delivery or de-orbit releasing according to the designated targets in turn; and Step 600: the post-release energy dissipation stage: performing energy dissipating and unloading according to the direction of the residual rotational momentum of the contra-rotating transmission mechanism, and proceeding to the next energy storage cycle after completion of the energy dissipation and unloading.

The energy dissipation and unloading method involves with enabling the magnetic moment generated by the strong magnetic moment generating device and the accelerated rotation process in opposite directions to dissipate and unload the residual rotational momentum of the contra-rotating transmission mechanism, which is substantially opposite to the energy storage process.

Wherein the target articles S are respectively arranged on one end of the delivery connection rod structure or at both ends thereof at the same time. The target article S is generally a space debris.

In this embodiment, the method of adjusting two slidable mass blocks may be replaced by another adjustment method, which is to adjust the rod lengths of the two delivery connection rod structures.

According to the present invention, through the balance effect of the external torque of the contra-rotating transmission mechanism and the strong magnetic moment generating device in the geomagnetic field and the external torque of the strong magnetic moment generating device in the geomagnetic field, the strong magnetic moment generating device is free of accelerated rotation of an attitude, so as to solve the problems that deep coupling between the direction adjustment of the magnet and the flight process inevitably occurs and the dual coupling of acceleration and orbit increases the difficulty and uncertainty.

Moreover, the output torque of the contra-rotating transmission mechanism of the present invention may not be restricted by the geomagnetic field, and can be higher by being directly transmitted through the transmission structure (high-precision torque motor), thereby speeding up the energy storage process. The entire energy storage process does not require the geomagnetic field and strong magnetic moment, eliminating the need for energy storage acceleration process. The strong magnetic moment and geomagnetic moment are mainly used to unload the residual rotational momentum of the contra-rotating system, and can also deliver two or more targets in sequence.

Although the present invention has been described in detail above with general descriptions and specific examples, some modifications or improvements can be made on the basis of the present invention, which is obvious to those skilled in the art. Therefore, all these modifications or improvements made without departing from the spirit of the present invention fall within the scope of the present invention.

INDUSTRIAL APPLICABILITY

According to the present invention, through the balance effect of the external torque of the contra-rotating transmission mechanism and the strong magnetic moment generating device in the geomagnetic field and the external torque of the strong magnetic moment generating device in the geomagnetic field, the strong magnetic moment generating device is free of accelerated rotation of an attitude, so as to solve the problems that deep coupling between the direction adjustment of the magnet and the flight process inevitably occurs and the dual coupling of acceleration and orbit increases the difficulty and uncertainty.

Moreover, the output torque of the contra-rotating transmission mechanism of the present invention may not be restricted by the geomagnetic field, and can be higher by being directly transmitted through the transmission structure (high-precision torque motor), thereby speeding up the energy storage process. The entire energy storage process does not require the geomagnetic field and strong magnetic moment, eliminating the need for energy storage acceleration process. The strong magnetic moment and geomagnetic moment are mainly used to unload the residual rotational momentum of the contra-rotating system, and can also deliver two or more targets in sequence.

What is claimed is:

1. A transfer type contra-rotating geomagnetic energy storage-release delivery system, comprising: a control system, a three-axis control moment canceller and an energy system for supplying power to the control system and the three-axis control moment canceller, wherein the control system, the three-axis control moment canceller and the energy system are arranged on a delivery mother spacecraft, wherein the delivery mother spacecraft is connected, through support rod structures, with a strong magnetic moment generating device, a contra-rotating transmission mechanism and a first delivery connection rod structure and a second delivery connection rod structure for delivering a target article;

the first delivery connection rod structure is vertically connected to an end of the support rod structure, the contra-rotating transmission mechanism is arranged on a portion of the support rod structure close to the first delivery connection rod structure, the strong magnetic moment generating device is arranged between the contra-rotating transmission mechanism and the delivery mother spacecraft, the second delivery connection rod structure is arranged between the contra-rotating transmission mechanism and the strong magnetic moment generating device, a first slidable mass block and a second slidable mass block are respectively arranged on the first delivery connection rod structure and the second delivery connection rod structure, and the strong magnetic moment generating device and the contra-rotating transmission mechanism provide energy through the energy system.

2. The transfer type contra-rotating geomagnetic energy storage-release delivery system according to claim 1, wherein the strong magnetic moment generating device is composed of two orthogonally-arranged solenoid coils, and planes of the two orthogonally-arranged solenoid coils are perpendicular to an axial direction of the support rod structure.

3. The transfer type contra-rotating geomagnetic energy storage-release delivery system according to claim 2, wherein the two orthogonally-arranged solenoid coils generate a strong magnetic moment by using superconductor materials and a low-temperature system.

4. The transfer type contra-rotating geomagnetic energy storage-release delivery system according to claim 3, wherein the target articles are respectively arranged on one end of the first delivery connection rod structure and one end of the second delivery connection rod structure, or at two ends of the first delivery connection rod structure and two ends of the second delivery connection rod structure at the same time.

5. A transfer type contra-rotating geomagnetic energy storage-release delivery method based on the transfer type contra-rotating geomagnetic energy storage-release delivery system of claim 1, comprising:

step 100: respectively determining an energy storage direction and an energy storage strategy based on an orbital flight inclination of the delivery mother spacecraft and a relation between the orbital flight inclination and a set angle;

step 200: measuring a current flight attitude of the delivery mother spacecraft, adjusting the current flight attitude of the delivery mother spacecraft, associating a direction of a generated magnetic moment, a direction of an energy storage accumulation magnetic moment and the current flight attitude of the delivery mother spacecraft, and maintaining the current flight attitude after association;

step 300: after a preparation for delivering the target article is finished, adjusting the first slidable mass block and the second slidable mass block respectively on the first delivery connection rod structure and the second delivery connection rod structure to allow moments of inertia of two assemblies relative to a transmission shaft of a contra-rotating transmission mechanism to be identical, wherein each of the two assemblies is composed of the target article, the first or second slidable mass block and the first or second delivery connection rod structure;

step 400: pneumatically starting the contra-rotating transmission mechanism to enable the two assemblies to perform an accelerated rotation in opposite directions;

step 500: detecting whether relative linear velocities corresponding to angular velocities of the two assemblies when rotating satisfy requirements for a delivery or a de-orbit, if the relative linear velocities do not satisfy the requirements, returning back to step 300, and if the relative linear velocities satisfy the requirements, terminating a process of the accelerated rotation of the two assemblies in the opposite directions, and performing the delivery or a de-orbit releasing according to designated targets in turn; and step 600: performing an energy dissipating and unloading according to a direction of a residual rotational momentum of the contra-rotating transmission mechanism, and proceeding to a next energy storage cycle after a completion of the energy dissipating and unloading.

6. The transfer type contra-rotating geomagnetic energy storage-release delivery method according to claim 5, wherein when the moments of inertia of the two assemblies relative to the transmission shaft of the contra-rotating transmission mechanism are identical, and during a contra-rotation, there is no an active interference with a rotation attitude of the delivery mother spacecraft and the strong magnetic moment generating device.

7. The transfer type contra-rotating geomagnetic energy storage-release delivery method according to claim 5, wherein a method for the energy dissipating and unloading in the step 600 comprises enabling the strong magnetic moment generated by the strong magnetic moment generating device and the process of the accelerated rotation in the opposite directions to dissipate and unload the residual rotational momentum of the contra-rotating transmission mechanism.

* * * * *